United States Patent
Li

(10) Patent No.: US 10,798,760 B2
(45) Date of Patent: Oct. 6, 2020

(54) METHOD FOR CONTROLLING NETWORK SLICE, FORWARDING DEVICE, CONTROL DEVICE, AND COMMUNICATIONS SYSTEM

(71) Applicant: HUAWEI TECHNOLOGIES CO., LTD., Shenzhen, Guangdong (CN)

(72) Inventor: Guangpeng Li, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/413,448

(22) Filed: May 15, 2019

(65) Prior Publication Data

US 2019/0289647 A1 Sep. 19, 2019

Related U.S. Application Data

(63) Continuation of application No. PCT/CN2017/117419, filed on Dec. 20, 2017.

(30) Foreign Application Priority Data

Dec. 23, 2016 (CN) .......................... 2016 1 1209287

(51) Int. Cl.
*H04L 12/28* (2006.01)
*H04W 76/11* (2018.01)
(Continued)

(52) U.S. Cl.
CPC ......... *H04W 76/11* (2018.02); *H04L 27/2666* (2013.01); *H04L 41/0803* (2013.01);
(Continued)

(58) Field of Classification Search
None
See application file for complete search history.

(56) References Cited

U.S. PATENT DOCUMENTS

| 9,058,119 B1 | 6/2015 | Ray, III et al. |
| 2010/0191757 A1 | 7/2010 | Noguchi et al. |
| | (Continued) | |

FOREIGN PATENT DOCUMENTS

| CN | 101309276 A | 11/2008 |
| CN | 101510815 A | 8/2009 |
| | (Continued) | |

OTHER PUBLICATIONS

Daniel Camps-Mur et al., "5G-XHaul: Enabling scalable virtualization for future 5G Transport Networks", 2016 15th International Conference on Ubiquitous Computing and Communications and 2016 8th International Symposium on Cyberspace and Security, IEEE. Dec. 2016, pp. 173-180. XP33048798.
(Continued)

*Primary Examiner* — Clemence S Han
(74) *Attorney, Agent, or Firm* — Womble Bond Dickinson (US) LLP

(57) ABSTRACT

The method includes: receiving, by a first forwarding device, a first control packet sent by a control device, where the first control packet carries N pieces of control information and N network slice identifiers, the N pieces of control information are in a one-to-one correspondence with the N network slice identifiers, where $i \in [1, N]$, and $N \geq 1$; determining, by the first forwarding device, M pieces of first control information from the N pieces of control information based on the N network slice identifiers, where the M pieces of first control information are in a one-to-one correspondence with M first network slices, and the M first network slices are borne on the first forwarding device, where $M \geq 1$; and controlling, by the first forwarding device, a first network slice j based on first control information j, where $j \in [1, M]$. This application can reduce processing burden of the control device.

20 Claims, 3 Drawing Sheets

(51) Int. Cl.
*H04W 76/12* (2018.01)
*H04L 27/26* (2006.01)
*H04L 12/24* (2006.01)
*H04L 29/08* (2006.01)

(52) U.S. Cl.
CPC ...... *H04L 41/0893* (2013.01); *H04L 41/0896* (2013.01); *H04L 41/12* (2013.01); *H04L 67/1097* (2013.01); *H04W 76/12* (2018.02)

(56) References Cited

U.S. PATENT DOCUMENTS

| | | |
|---|---|---|
| 2013/0223454 A1 | 8/2013 | Dunbar et al. |
| 2014/0122672 A1 | 5/2014 | Chen et al. |
| 2014/0269295 A1 | 9/2014 | Anumala |
| 2014/0314100 A1 | 10/2014 | Song |
| 2017/0142591 A1* | 5/2017 | Vrzic ................. H04L 47/2408 |
| 2018/0206152 A1* | 7/2018 | Zhang ................. H04M 15/66 |
| 2018/0368056 A1* | 12/2018 | Wang ................. H04W 48/18 |
| 2019/0037409 A1* | 1/2019 | Wang ................. H04W 28/06 |
| 2019/0123995 A1 | 4/2019 | Ouyang et al. |
| 2019/0141169 A1* | 5/2019 | Ni ......................... H04L 69/24 |
| 2019/0223018 A1* | 7/2019 | Norrman ......... H04W 12/00518 |
| 2019/0239150 A1* | 8/2019 | Ma ....................... H04W 60/00 |
| 2019/0246334 A1* | 8/2019 | Wang .................... H04W 48/02 |

FOREIGN PATENT DOCUMENTS

| | | |
|---|---|---|
| CN | 101674234 A | 3/2010 |
| CN | 103067278 A | 4/2013 |
| CN | 103795602 A | 5/2014 |
| CN | 104106242 A | 10/2014 |
| CN | 104113609 A | 10/2014 |
| CN | 104158737 A | 11/2014 |
| CN | 104253767 A | 12/2014 |
| CN | 105207909 A | 12/2015 |
| CN | 105339934 A | 2/2016 |
| CN | 105812217 A | 7/2016 |
| EP | 3043519 A1 | 7/2016 |
| WO | 2016/192637 A1 | 12/2016 |

OTHER PUBLICATIONS

Network softwarization group: "Output Document: Report on application of network softwarization to IMT-2020", International Telecommunication Union, Focus Group on IMT-2020, Geneva, Dec. 5-9, 2016. total 146 pages. XP44242603.

Peter Rost et al: "Functional Network Architecture and Security Requirements 5G NORMA D3.1 Deliverable", Dec. 31, 2015. total 60 pages. XP055349097.

Motorola Mobility et al. Solution: Simultaneous Access to Multiple Independent Network Slices, SA WG2 Meeting #115, S2-162314, May 23-27, 2016, Nanjing, P.R. China. Total 6 pages.

* cited by examiner

METHOD FOR CONTROLLING NETWORK SLICE, FORWARDING DEVICE, CONTROL DEVICE, AND COMMUNICATIONS SYSTEM

CROSS-REFERENCE TO RELATED APPLICATIONS

This application is a continuation of International Application No. PCT/CN2017/117419, filed on Dec. 20, 2017, which claims priority to Chinese Patent Application No. 201611209287.4, filed on Dec. 23, 2016. The disclosures of the aforementioned applications are hereby incorporated by reference in their entireties.

TECHNICAL FIELD

This application relates to the communications field, and more specifically, to a method for controlling a network slice, a forwarding device, a control device, and a communications system.

BACKGROUND

Currently, in an existing network slice technology, a single physical network provided by a first-level operator may be divided into a plurality of virtual networks (or network slices), and different network slices may be provided for different second-level operators to provide different services, so that a plurality of services can be provided by using the single physical network.

In the prior art, a first-level operator may allocate a second-level controller to a second-level operator, and the second-level operator may have complete management and control of a network slice by using the second-level controller. Specifically, the second-level controller may deliver management information (or control information, for example, configuration information of a service path) to each forwarder (or a forwarding node) in a physical network corresponding to the network slice by using a control device of the first-level operator, for example, a network virtualization platform (for example, OpenVirteX).

In the control device, a mapping relationship between a virtual address of each network slice (for example, an identifier of a network slice) and an actual address of each network slice (for example, a forwarder of each network slice) is maintained, so that the second-level controller can send the control information to the control device based on the virtual address of the controlled network slice, and further, the control device can deliver the configuration information to the forwarder of the network slice based on the mapping relationship, to complete specific configuration of the network slice.

In a real network operation scenario, because there is a large quantity of network slices, processing load of the control device is enormous, and a performance requirement for the control device is relatively high. Consequently, promotion and popularization of the network slice technology are severely affected, and practicality of the network slice technology is reduced.

SUMMARY

Embodiments of the present application provide a method and an apparatus for controlling a network slice, to reduce processing burden of a control device.

According to a first aspect, a method for controlling a network slice is provided, and is applied to a system that includes a control device and at least one forwarding device. The method includes: receiving, by a first forwarding device, a first control packet sent by the control device, where the first control packet carries N pieces of control information and N network slice identifiers, the N pieces of control information are in a one-to-one correspondence with the N network slice identifiers, and a network slice identifier i corresponding to control information i is an identifier of a network slice controlled by using the control information i, where $i \in [1, N]$, and $N \geq 1$; determining, by the first forwarding device, M pieces of first control information from the N pieces of control information based on the N network slice identifiers, where the M pieces of first control information are in a one-to-one correspondence with M first network slices, and the M first network slices are borne on the first forwarding device, where $M \geq 1$; and controlling, by the first forwarding device, a first network slice j based on first control information j, where $j \in [1, M]$.

According to the method for controlling a network slice in this embodiment of the present application, the control device sends, to the first forwarding device, the first control packet that carries the N pieces of control information and the N network slice identifiers, so that the first forwarding device can determine, based on the one-to-one correspondence between the N pieces of control information and the N network slice identifiers, a network slice controlled by using each piece of control information, and can determine, from the N pieces of control information, the first control information corresponding to the first network slice (specifically, an identifier of the first network slice) that is borne on the first forwarding device, and further the first forwarding device can control or manage the first network slice based on the first control information. Therefore, in this embodiment of the present application, without distinguishing network slices corresponding to different control information, the control device can complete delivering of each piece of control information, to reduce processing burden of the control device.

In one embodiment of the first aspect, the first control packet is a dedicated packet for the first forwarding device.

In one embodiment of the first aspect, each of the N pieces of control information is the first control information.

According to the method for controlling a network slice in this embodiment of the present application, the first control packet is a dedicated packet for the first forwarding device, and each of the N pieces of control information is the first control information, and therefore the first forwarding device does not need to exclude, from the N pieces of control information, control information sent by the control device to another forwarding device, to reduce burden of the forwarding device.

In one embodiment of the first aspect, the first control packet is a packet sent to a plurality of forwarding devices including the first forwarding device.

In one embodiment of the first aspect, the N pieces of control information include second control information in addition to the first control information, the second control information is used to control a second network slice, and the second network slice is borne on a second forwarding device.

According to the method for controlling a network slice in this embodiment of the present application, the N pieces of control information include the first control information of the first forwarding device and second control information of another forwarding device, and therefore the control device does not need to perform differentiated processing based on a receive end on different control information when delivering the control information, to further reduce processing burden of the control device.

In one embodiment of the first aspect, the communications system includes a common network slice, and the common network slice is borne on all forwarding devices in the system.

In one embodiment of the first aspect, the receiving, by a first forwarding device, a first control packet sent by the control device includes: receiving, by the first forwarding device by using a control channel of the common network slice, the first control packet sent by the control device.

The common network slice is set, and a channel capable of supporting communication between the control device and all the forwarding devices in the system can be provided based on the common network slice, so that implementation of the method for controlling a network slice in this embodiment of the present application can be reliably ensured.

In one embodiment of the first aspect, the method further includes: sending, by the first forwarding device, at least one type of the following information to the control device by using the control channel of the common network slice: resource status information of the first forwarding device, topology information of the common network slice, and fault information of the first forwarding device.

According to a second aspect, a method for controlling a network slice is provided, and is applied to a system that includes a control device and at least one forwarding device. The method includes: obtaining, by the control device, N pieces of control information and N network slice identifiers, where the N pieces of control information are in a one-to-one correspondence with the N network slice identifiers, and a network slice identifier i corresponding to control information i is an identifier of a network slice controlled by using the control information i, the N pieces of control information include M pieces of first control information, the M pieces of first control information are in a one-to-one correspondence with M first network slices, and the M first network slices are borne on a first forwarding device, where i∈[1, N], N≥1, and M≥1; and sending, by the control device, a first control packet to the first forwarding device, where the first control packet carries the N pieces of control information and the N network slice identifiers.

According to the method for controlling a network slice in this embodiment of the present application, the control device sends, to the first forwarding device, the first control packet that carries the N pieces of control information and the N network slice identifiers, so that the first forwarding device can determine, based on the one-to-one correspondence between the N pieces of control information and the N network slice identifiers, a network slice controlled by using each piece of control information, and can determine, from the N pieces of control information, the first control information corresponding to the first network slice (specifically, an identifier of the first network slice) that is borne on the first forwarding device, and further the first forwarding device can control or manage the first network slice based on the first control information. Therefore, in this embodiment of the present application, without distinguishing network slices corresponding to different control information, the control device can complete delivering of each piece of control information, to reduce processing burden of the control device.

In one embodiment of the second aspect, the first control packet is a dedicated packet for the first forwarding device.

In one embodiment of the second aspect, each of the N pieces of control information is the first control information.

According to the method for controlling a network slice in this embodiment of the present application, the first control packet is a dedicated packet for the first forwarding device, and each of the N pieces of control information is the first control information, and therefore the first forwarding device does not need to exclude, from the N pieces of control information, control information sent by the control device to another forwarding device, to reduce burden of the forwarding device.

In one embodiment of the second aspect, the first control packet is a packet sent to a plurality of forwarding devices including the first forwarding device.

In one embodiment of the second aspect, the N pieces of control information include second control information in addition to the first control information, the second control information is used to control a second network slice, and the second network slice is borne on a second forwarding device.

According to the method for controlling a network slice in this embodiment of the present application, the N pieces of control information include the first control information of the first forwarding device and second control information of another forwarding device, and therefore the control device does not need to perform differentiated processing based on a receive end on different control information when delivering the control information, to further reduce processing burden of the control device.

In one embodiment of the second aspect, the communications system includes a common network slice, and the common network slice is borne on all forwarding devices in the system.

The common network slice is set, and a channel capable of supporting communication between the control device and all the forwarding devices in the system can be provided based on the common network slice, so that implementation of the method for controlling a network slice in this embodiment of the present application can be reliably ensured.

In one embodiment of the second aspect, the sending, by the control device, a first control packet to the first forwarding device includes: sending, by the control device, the first control packet to the first forwarding device by using a control channel of the common network slice.

In one embodiment of the second aspect, in a seventh implementation of the second aspect, the method further includes: receiving, by the control device by using the control channel of the common network slice, at least one type of the following information sent by the first forwarding device: resource status information of the first forwarding device, topology information of the common network slice, and fault information of the first forwarding device.

According to a third aspect, a forwarding device is provided, including units configured to perform all operations of the method for controlling a network slice in the first aspect and all the embodiments of the first aspect.

According to a fourth aspect, a control device is provided, including units configured to perform all operations of the method for controlling a network slice in the second aspect and all the embodiments of the second aspect.

According to a fifth aspect, a forwarding device is provided, including a memory and a processor. The memory is configured to store a computer program, and the processor is configured to invoke and run the computer program from the memory, so that the forwarding device performs the method for controlling a network slice in any one of the first aspect and all the embodiments of the first aspect.

According to a sixth aspect, a control device is provided, including a memory and a processor. The memory is configured to store a computer program, and the processor is configured to invoke and run the computer program from the memory, so that the control device performs the method for controlling a network slice in any one of the second aspect and all the embodiments of the second aspect.

According to a seventh aspect, a computer program product is provided, and the computer program product includes computer program code. When the computer program code is run by a processing unit and a communications unit or a processor and a transceiver of a forwarding device, the forwarding device is enabled to perform the method for controlling a network slice in any one of the first aspect and all the embodiments of the first aspect.

According to an eighth aspect, a computer program product is provided, and the computer program product includes computer program code. When the computer program code is run by a processing unit and a communications unit or a processor and a transceiver of a control device, the control device is enabled to perform the method for controlling a network slice in any one of the second aspect and all the embodiments of the second aspect.

According to a ninth aspect, a computer readable storage medium is provided, the computer readable storage medium stores a program, and the program enables a forwarding device to perform the method for controlling a network slice in any one of the first aspect and all the embodiments of the first aspect.

According to a tenth aspect, a computer readable storage medium is provided, the computer readable storage medium stores a program, and the program enables a control device to perform the method for controlling a network slice in any one of the second aspect and all the embodiments of the second aspect.

According to an eleventh aspect, a communications system is provided, including a forwarding device configured to perform the method for controlling a network slice in the first aspect and all the embodiments of the first aspect and a control device configured to perform the method for controlling a network slice in the second aspect and all the embodiments of the second aspect.

DESCRIPTION OF EMBODIMENTS

Figure 1:
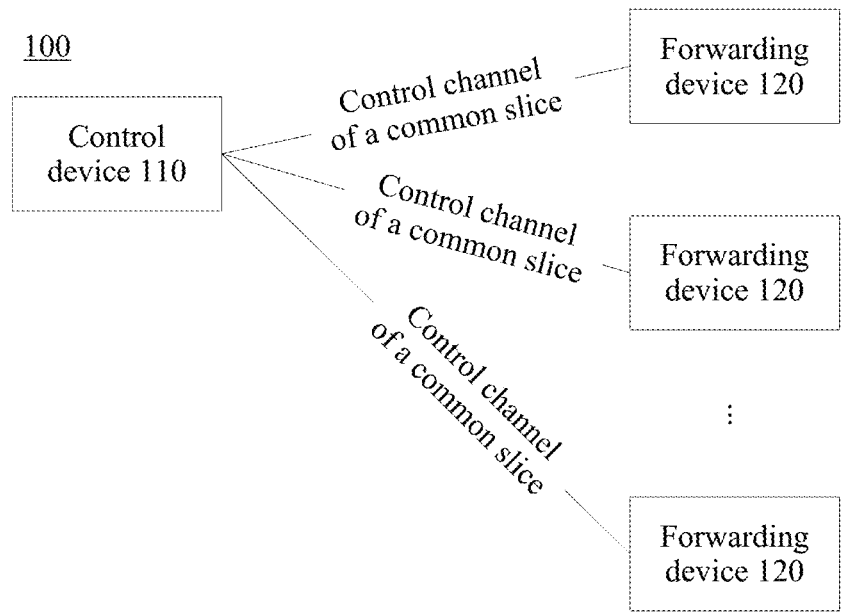
FIG. 1 is a schematic structural diagram of an example of a system using a method and an apparatus for controlling a network slice according to an embodiment of the present application.

The following describes the technical solutions in this application with reference to the accompanying drawings.

A method and an apparatus for controlling a network slice provided in the embodiments of the present application can be applied to a computer, and the computer includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems that implement service processing by using a process, for example, a Linux operating system, an Unix operating system, an Android operating system, an iOS operating system, or a Windows operating system. The application layer includes applications such as a browser, an address book, word processing software, and instant messaging software. In the embodiments of the present application, the computer may be a handheld device such as a smartphone, or may be a terminal device such as a personal computer. The computer is not specifically limited in the embodiments of the present application, provided that the computer can run a program of code that stores the operations of the method for controlling a network slice in the embodiments of the present application, to control a network slice by using the method for controlling a network slice in the embodiments of the application. An execution unit for controlling a network slice in the embodiments of the present application may be a computer device, or a function module that can invoke a program and execute the program in a computer device.

In addition, aspects or features of the embodiments of the present application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, storage media described in this specification may indicate one or more devices and/or other machine-readable media that is used to store information. The term "machine readable media" may include but is not limited to a radio channel, and other media that can store, contain and/or carry an instruction and/or data.

First, an architecture of a system using the method and the apparatus for controlling a network slice in the embodiments of the present application is described with reference to FIG. 1.

FIG. 1 is a schematic structural diagram of an example of a system 100 for controlling a network slice according to an embodiment of the present application. As shown in FIG. 1, the system 100 includes:

a control device 110; and at least one forwarding device 120.

The control device 110 is communicatively connected to each of the at least one forwarding device 120, that is, the control device 110 can perform exchanges of messages, information, or data transmission with each forwarding device 120.

For example, the control device 110 can communicate with each forwarding device 120 by using a control channel (for example, a control channel of a common slice described below).

As an example the control channel may be a channel based on a control channel protocol. The control channel protocol may be the OpenFlow protocol, the Path Computation Element Communication Protocol (PCEP), the Border Gateway Protocol (BGP), the Interface to the Routing System (I2RS), or the like.

In this embodiment of the present application, a network provided by the system 100 may be divided into a plurality of network slices. A process of creating and maintaining each network slice may be known. To avoid repetition, detailed descriptions are omitted herein.

In this embodiment of the present application, a network slice is borne on (one or more) forwarding devices 120.

In other words, a forwarding device 120 runs (one or more) virtual forwarders for (one or more) network slices.

In this embodiment of the present application, each network slice may be borne on a part or all of the at least one forwarding device 120. In addition, forwarding devices on which any two network slices are borne may be totally the same, or may be partially the same, or may be totally different. This is not specifically limited in the present application.

In addition, in this embodiment of the present application, a same forwarding device 120 may carry a plurality of network slices. That is, in this embodiment of the present application, the same forwarding device 120 may run a virtual forwarder of each of the plurality of network slices.

In this embodiment of the present application, the control device 110 may be a first-level controller provided by a first-level operator, for example, a virtual control platform. The control device 110 may obtain control information of each network slice, and deliver the control information to a forwarder 120, so that the forwarder 120 can manage and control the network slice based on the obtained control information.

A process of delivering the control information by the controller 110 is subsequently described in detail.

It should be noted that, in this embodiment of the present application, each device in the system 100 shown in FIG. 1 may be an entity device or a virtual device. For example, the virtual device may be a virtual machine that has a function for providing devices in a computer system. This is not specifically limited in this embodiment of the present application.

In this embodiment of the present application, the control device 110 may be configured to collect a physical network resource and a physical network topology, receive a network slice operation request, and perform global resource allocation calculation.

In this embodiment of the present application, a device slice management program may run in the forwarder 120 to manage a device slice resource and report a device resource status, receive and process a service slice control instruction, generate a device slice event and report the device slice event, monitor a device and link fault, and perform fault recovery.

It should be understood that the device included in the system 100 shown in FIG. 1 is merely an example for description. The present application is not limited thereto. For example, in this embodiment of the present application, in addition to the control device 110 and the forwarding device 120, the system 100 may include one or more of the following devices:

a virtual network function manager (VNFM), a network slicing manager (NSLM), a network functions virtualization orchestrator (NFVO), a network slicing orchestrator (NSLO), a physical infrastructure manager (PIM), one or more second-level controllers, and the like.

A structure and a function of each of the foregoing devices may be known. For example, a second-level controller may be a device provided by a first-level operator, and a virtual controller that is provided for one or more second-level operators for managing (or controlling) a network slice may be generated and run in the second-level controller by using, for example, a virtualization technology, so that the second-level operator can generate, by using the second-level controller, control information of a network slice that is provided by the first-level operator for the second-level operator.

In this embodiment of the present application, the control device 110 may be communicatively connected to each second-level controller, so that the control device 110 can obtain control information of each network slice from the second-level controller.

Figure 2:
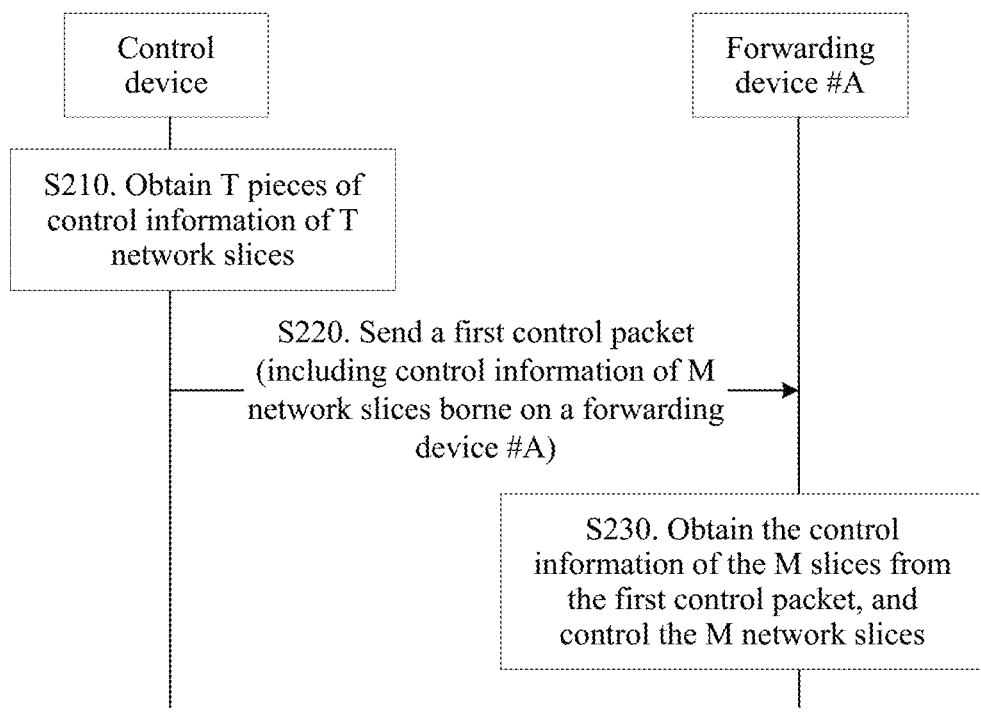
FIG. 2 is a schematic interaction diagram of a method for controlling a network slice according to an embodiment of the present application.

The following describes in detail the method for controlling a network slice in this embodiment of the present application with reference to FIG. 2.

In this embodiment of the present application, a communications system may include a plurality of forwarders, and a process of obtaining control information by each forwarder may be similar. For ease of understanding and description, the following uses a process of obtaining control information by a forwarder #A as an example to describe in detail the method for controlling a network slice in this embodiment of the present application.

In addition, in this embodiment of the present application, the forwarder #A may carry a plurality of (for example, K) network slices, where K≥1. In other words, in this embodiment of the present application, the forwarder #A runs K virtual forwarders, the K virtual forwarders are in a one-to-one correspondence with the K network slices, and each virtual forwarder is configured to forward data or signaling of a corresponding network slice.

FIG. 2 is a schematic interaction diagram of an example of a method 200 for controlling a network slice according to an embodiment of the present application. As shown in FIG. 2, the method 200 includes the following operations.

In operation S210, for example, a control device may obtain T pieces of control information (that is, an example of N pieces of control information, for example, T may be equal to N) from a plurality of second-level controllers, where T≥1.

The T pieces of control information are in a one-to-one correspondence with T network slices (that is, an example of N network slices, for example, T may be equal to N). Specifically, the T pieces of control information are in a one-to-one correspondence with identifiers of the T network slices (also referred to as "network slice identifiers"), and an identifier of a network slice may uniquely identify the network slice.

For example, in this embodiment of the present application, when sending control information to the control device, each second-level controller may send, to the control device, mapping relationship information used to indicate a correspondence between the control information and an identifier of a network slice controlled by using the control information, so that the control device can determine a correspondence between each piece of control information and each network slice identifier (or each network slice) based on the mapping relationship information.

For another example, when sending control information to the control device, each second-level controller may add the control information and an identifier of a network slice controlled by using the control information to a same packet (or a message) and send the packet to the control device, so that the control device can determine a correspondence between each piece of control information and each network slice identifier (or each network slice) based on whether the control information and the identifier of the network slice are carried in the same packet.

In this embodiment of the present application, a packet may also be referred to as a message or signaling. To avoid repetition, descriptions of a same or similar case are omitted below.

In this embodiment of the present application, the T network slices may be all network slices running (or obtained through division) in a communications system, or the T network slices may be a part of network slices running (or obtained through division) in a communications system. This is not specifically limited in the present application.

The T network slices include M network slices (that is, an example of first network slices, and for ease of understanding and differentiation, the M network slices are marked as a network slice $\#A_1$ to a network slice $\#A_M$ below) that are borne on the foregoing forwarder #A, where M≥1.

A value of M may be equal to a value of K, which indicates the number of network slices borne on the forward #A. That is, the N network slices may include all network slices borne on the forwarder #A. Alternatively, a value of M may be less than a value of K, that is, the N network slices may include a part of network slices borne on the forwarder #A. This is not specifically limited in the present application.

Therefore, in operation S220, the control device may send control information (that is, an example of first control information, and for ease of understanding and description, the control information is marked as control information #A below) that is corresponding to the M network slices to the forwarder #A.

In this embodiment of the present application, the control device may transmit the control information #A to the forwarding device #A in the following manners.

Manner 1

In this embodiment of the present application, the control device may send, to all forwarding devices (including the forwarding device #A) in the system, a control packet #A (that is, an example of a first control packet) that carries the identifiers of the T network slices (that is, an example of N network slice identifiers) and the T pieces of control information (that is, an example of the N pieces of control information) including the control information #A, or the control device may send, to all forwarding devices (including the forwarding device #A) in the system, a control packet #A (that is, another example of a first control packet) that carries a mapping relationship between the T pieces of control information and the identifiers of the T network slices.

The control packet #A may be a packet that may be sent to a plurality of devices.

In this embodiment of the present application, the forwarding device #A may learn of identifiers of all network slices (that is, the foregoing K network slices) that are borne on the forwarding device #A. For example, an entry #A may be stored in the forwarding device #A, and an identifier of a network slice borne on the forwarding device #A is recorded in the entry #A.

Therefore, after receiving the control packet #A, the forwarding device #A may determine identifiers (for ease of understanding and description, the identifiers are marked as an identifier $\#A_1$ to an identifier $\#A_M$ below) of network slices that belong to the entry #A from the identifiers of the T network slices based on the entry #A, and further, the forwarding device #A may determine that the network slices indicated by the identifier $\#A_1$ to the identifier $\#A_M$ are network slices that need to be controlled or managed based on the control packet #A and that are borne on the forwarding device #A, namely, the network slice $\#A_1$ to the network slice $\#A_M$.

Further, the forwarding device #A may use control information in the T pieces of control information that is corresponding to the network slice $\#A_1$ to the network slice $\#A_M$ as M pieces of control information #A and a one-to-one correspondence between the M network slices (that is, the network slice $\#A_1$ to the network slice $\#A_M$) and the M pieces of control information #A.

It should be noted that, in manner 1, a forwarding device #C may be included in the communications system. The T pieces of control information do not include control information of a network slice borne on the forwarding device #C. In other words, none of the T network slices corresponding to the T pieces of control information are borne on the forwarding device #C.

In addition, in manner 1, a forwarding device #D may be included in the communications system. The T pieces of control information include control information of a network slice borne on the forwarding device #D. In other words, the T network slices corresponding to the T pieces of control information include a network slice borne on the forwarding device #D.

Manner 2

In this embodiment of the present application, the control device may learn of a forwarding device on which each network slice is borne or a network slice borne on each forwarder.

For example, an entry #B may be stored in the control device, and the forwarding device on which each network slice is borne may be recorded in the entry #B.

An Example of the Entry #B

| Network slice (or network slice identifier) | Forwarding device on which the network slice is borne |
|---|---|
| Network slice #1 | Forwarding device #a, forwarding device #b, . . . , and forwarding device #z |
| . . . | . . . |
| Network slice #W | Forwarding device #α, forwarding device #β, . . . , and forwarding device #γ |

Alternatively, an entry #C may be stored in the control device, and a network slice borne on each forwarding device may be recorded in the entry #C.

An Example of the Entry #C

| Forwarding device | Network slice borne on the forwarding device (or network slice identifier) |
|---|---|
| Forwarding device #A | Network slice #a, network slice #b, . . . , and network slice #z |
| . . . | . . . |
| Forwarding device #W | Network slice #α, network slice #β, . . . , and network slice #γ |

It should be understood that the foregoing enumerated entries are merely examples for description. The present application is not limited thereto. Other methods used by the control device to learn of the forwarding device on which each network slice is borne or the network slice borne on each forwarder fall within the protection scope of this embodiment of the present application.

Therefore, the control device may determine identifiers (that is, the identifier $\#A_1$ to the identifier $\#A_M$) of network slices borne on the forwarding device #A from the identifiers of the T network slices based on, for example, the entry #B or the entry C, and further, the forwarding device #A may determine that the network slices indicated by the identifier $\#A_1$ to the identifier $\#A_M$ are network slices that need to be controlled or managed based on the control packet #A and that are borne on the forwarding device #A, namely, the network slice $\#A_1$ to the network slice $\#A_M$.

Further, the control device may use control information in the T pieces of control information that is corresponding to the network slice $\#A_1$ to the network slice $\#A_M$ as M pieces of control information #A.

Then, the control device may send, to the forwarding device #A, a control packet #B (that is, another example of a first control packet) that carries the M pieces of control information #A (that is, another example of the N pieces of control information) and the identifiers of the network slice $\#A_1$ to the network slice $\#A_M$ (that is, another example of the N pieces of control information), or the control device may send, to the forwarding device #A, a control packet #B (that is, another example of a first control packet) that carries a mapping relationship between the M pieces of control information #A and the identifiers of the network slice $\#A_1$ to the network slice $\#A_M$.

The control packet #B may be dedicated signaling or a dedicated message that is sent by the control device only to the forwarding device #A. "Dedicated" may mean that the control packet #B is not sent to a forwarding device other than the forwarding device #A.

To be specific, in this embodiment of the present application, control information carried in the control packet #B is control information of all network slices borne on the forwarding device #A.

In other words, in this embodiment of the present application, the control packet #B does not include control information of a network slice that is not borne on the forwarding device #A.

Therefore, the forwarding device #A can obtain the M pieces of control information #A and a one-to-one correspondence between the M network slices (that is, the network slice $\#A_1$ to the network slice $\#A_M$) and the M pieces of control information #A from the control packet #B.

In this way, the forwarding device #A can determine the one-to-one correspondence between the M network slices and the M pieces of control information #A in the, for example, manner 1 or manner 2.

In operation S230, the forwarding device #A may determine, based on the one-to-one correspondence between the M network slices and the M pieces of control information #A, control information corresponding to each of the network slice $\#A_1$ to the network slice $\#A_M$, and further complete control or management of the network slice $\#A_1$ to the network slice $\#A_M$.

In addition, as described above, in this embodiment of the present application, the control device is communicatively connected to each forwarding device to complete control packet transmission.

As an example, in one embodiment of the present application, a common slice (may also be referred to as "slice 0") borne on all forwarders may be created, and a management channel (may also be referred to as a control channel) of the common slice is used as a channel for transmitting a control packet.

Conventionally, control information of different network slices in the communications system may be sent by using respective management channels (or control channels) of the network slices. For example, the control device may send, by using a management channel of a network slice #W, control information of the network slice #W to a forwarding device that carries the network slice #W. For another example, the control device may send, by using a management channel of a network slice #Y, control information of the network slice #Y to a forwarding device that carries the network slice #Y. The network slice #W and the network slice #Y may be borne on a same forwarding device, or the network slice #W and the network slice #Y may be borne on different forwarding devices.

In contrast, in this embodiment of the present application, because the common network slice is borne on each forwarding device in the communications system, control information of different network slices in the communications system may be sent by using the management channel (or control channel) of the common network slice. For example, the control device may send, by using the management channel of the common network slice, the control information of the network slice #W to the forwarding device that carries the network slice #W, and the control device may send, by using the management channel of the common network slice, the control information of the network slice #Y to the forwarding device that carries the network slice #Y.

In this case, the control device does not need to establish a control channel for each network slice, so that burden of the control device can be further reduced.

In one embodiment, in addition to a control packet, each forwarding device (for example, the forwarding device #A) may send information such as resource status information of the forwarding device #A, topology information of the common network slice, and fault information of the forwarding device #A to the control device by using the management channel of the common slice.

In this embodiment of the present application, after the forwarding device is powered on, based on device slice configuration, a common slice (referred to as "slice 0" below) may be divided, the control device may be connected, and a network of the slice 0 may be built. A connection topology between the control device and each forwarding device may be: the control device is directly connected to each forwarding device; or a connection topology between the control device and each forwarding device may be: the control device is connected to each forwarding device in a distributed routing topology, such as an Open Shortest Path First (OSPF) topology.

It should be understood that the foregoing enumerated connection topologies between a forwarding device and the control device are merely examples for description, provided that a communication channel can be established between each forwarding device and the control device.

In this embodiment of the present application, each forwarding device may further run a topology discovery protocol such as the Link Layer Discovery Protocol (LLDP), to collect a physical network topology.

In addition, each forwarding device may further report the obtained physical network topology to the control device, so that the control device can store the physical network topology in a database, and monitor a physical topology status change event.

In this embodiment of the present application, each forwarding device may further run a device slice resource management program to collect a slice resource status, such as a quantity of virtual forwarding devices that can be divided, an available forwarding table capacity, an available port, or a logical port list.

In addition, each forwarding device may further send the obtained slice resource status to the control device, so that the control device can store slice resource status of all forwarding devices.

In this embodiment of the present application, after the forwarding device is powered on, the slice 0 is started by default. In this case, a link discovery packet is periodically sent on all ports in a power-on (UP) state in a link discovery process. A peer end receives the packet to parse neighbor information, and stores the neighbor information in a distributed control unit of the forwarding device. In addition to mandatory attributes such as an end identifier of an LLDP data unit, a bridge MAC address of a sending device, an interface identifier that identifies a transmit end of the LLDP data unit, and a survival period of information about the device on a neighbor node, content of the packet may include optional attributes such as description information of an Ethernet interface, a name of the device, system description information, a main system function, an enabled main function, and a management address, and include a nonstandard extended attribute.

The forwarding device may collect and store a largest quantity of virtual device slices, a division granularity, a device slice capability, a physical port list, and partition or aggregation granularity information that are of the device.

The forwarding device and the control device establish a control channel, and a centralized control unit periodically queries or accepts the foregoing reported available physical resource, and performs resource allocation algorithm initialization and network slice adjustment and maintenance.

In this embodiment of the present application, the control device may initialize a global resource allocation algorithm to monitor a physical network resource change event, for example, a resource change event related to a network slice such as a topology change, a forwarding capability change, or a forwarding table capacity change.

In this embodiment of the present application, the control device may receive a network slice creation request from a user (for example, a second-level operator), and the network slice creation request may include at least one type of the following information:

a network slice topology, a slicing device capability, a slicing device capacity, network slice link bandwidth, a network slice service level agreement (SLA), and a network slice forwarding policy.

An interface layer converts a requirement description into a network slice model object and sends the network slice model object to a slice management module for slice creation. The slice management module performs preliminary verification on a network slice requirement. After the verification is completed, a requirement object is stored in the database. A network slice model is defined as follows:

TABLE 1

Network slice

| Network slice information element | Necessity | Description |
| --- | --- | --- |
| Universally unique identifier UUID | Mandatory | Unique identifier of a network slice and generated by an NSLO |
| Name | Mandatory | Name of a network slice and provided by a network slice user on an interface |
| Network slice service level agreement Network slice SLA | Optional | Service level requirement of a network slice user on a network slice |
| Software defined networking controller SDN controller | Optional | Network slice controller information of a user, where the information may be from an NFVO layer, and specifically includes a controller name, an IP address, and a communications protocol port |
| Forwarding device (node) list Node list | Optional | Node information included in a network slice, where the node information specifically includes an edge node and an intermediate node of the network slice, edge node information is from the NFVO layer, and intermediate node information of the network slice is from a network hypervisor (NH) |
| Link list | Optional | Link information included in a network slice, where a user determines a network slice link based on selection of a node and an interface on an interface |
| State | Optional | Network slice status, such as initialization, creation, running, stop, and migration |

TABLE 2

Logical node of a slice

| Logical node element of a slice | Necessity | Description |
| --- | --- | --- |
| UUID | Mandatory | Unique identifier of a node in a network slice and generated by an NSLO |
| Device type | Mandatory | Network slice device type related to a physical device type, where the network slice device type specifically includes Router, Switch, OFSwitch, PTNDevice, and the like. Respective forwarding table slice information may |

TABLE 2-continued

Logical node of a slice

| Logical node element of a slice | Necessity | Description |
|---|---|---|
| | | be defined for different devices, for example, a forwarding table size may be defined for the OFSwitch device. A service capability of a router node, for example, whether a service capability such as Trill or multicast is supported |
| Interface list | Optional | Interface list |
| Supplementary forwarding device | Optional | The attribute is set to be true, indicating that the node does not belong to a virtual topology node set, but is a node through which a virtual link passes after virtual and physical mapping. |
| Supplementary node | | |

TABLE 3

Interface

| Interface information element | Necessity | Description |
|---|---|---|
| Identifier ID | Optional | Network slice interface ID |
| Name | Mandatory | Network slice interface name, 1/0/0 |
| Rate | Optional | Network slice interface rate |
| Access information Access Info | Optional | Network slice access interface information, where the information is from the NFVO layer, and specifically includes an access technology on an interface, for example, IP access, and the information needs to include an interface IP and a mask. |
| Statistics information Statistics Info | Optional | Interface statistics information, where the information is from an NH and is used in network slice status monitoring. |

TABLE 4

Link

| Link information element | Necessity | Description |
|---|---|---|
| Source | Mandatory | Source point of a link in a network slice, specifically including a node ID and interface information |
| Destination | Mandatory | Destination point of a link in a network slice, specifically including a node ID and interface information |
| Bandwidth | Optional | Network slice link bandwidth |
| Delay | Optional | Network slice link delay |
| Physical path | Optional | After a network slice is created, the physical path is used to describe physical path information corresponding to a slice link. |

TABLE 5

Network slice resource reservation SLA

| SLA element | Necessity | Description |
|---|---|---|
| Hard resource reservation Hard reservation | Optional | Hard resource reservation, where when a physical device supports any one of VS, Flex-Eth, Cop, and Pipline technologies, this resource reservation mode may be used. |
| Soft resource reservation Soft reservation | Optional | Soft resource reservation, where when a physical device does not support a hard resource isolation technology, a soft isolation mode may be used, for example, a TE tunnel. |
| Best effort | Optional | Best effort resource reservation mode |

TABLE 6

Network slice reliability and availability SLA (have been separately placed in resource reservation SLA options)

| SLA element | Necessity | Description |
|---|---|---|
| Reliability | Optional | Reliability description, where reliability is reflected by using a time length between two failures. |
| Availability | Optional | Availability description, where availability is described by using a percentage of an available service time such as 99.99% or 99.999%. |

The control device may verify validity and feasibility of a creation request and store network slice data after the verification succeeds.

Then, the control device may create a service network slice based on the network slice creation request, the slice resource status of the forwarding device, the physical network topology, and the like. For example, the control device may invoke the global resource allocation algorithm, and obtain a virtual and physical mapping result of the service network slice through calculation by using a slice requirement and a physical device slice resource status as input. The mapping result includes a physical device slice resource reservation set, and a physical device slice resource reservation set includes a device slice set, a forwarding capacity, an interface set, and a node capability set.

The control device may encapsulate an algorithm result into a resource reservation message, and send the resource reservation message to a corresponding forwarding device for slice installation.

The forwarding device decapsulates a service slice creation message, and allocates a distributed control plane resource (for example, a CPU, a memory, and a forwarding table), a data plane resource (for example, an NP, a forwarding queue, Quality of Service (QoS), and a network interface) to the service slice. If the service slice is a centralized SDN network, a control channel subnet is configured for the service slice in a network slice 0, and a method used includes but is not limited to configuration in a VPN.

After receiving a resource mapping instruction, the control device requests to perform resource mapping by using a resource mapping allocation algorithm. In the algorithm, a virtual topology is mapped to a physical topology based on current physical available resource information and a network slice requirement, and a resource reservation operation is performed. A mapping result includes node mapping (a physical node/node set to which a virtual node is mapped) and link mapping (a physical path/physical path list to which a virtual link is mapped).

After the resource mapping is completed, the control device waits for a network slice installation instruction to translate the mapping result into a network slice creation instruction that can be executed by the forwarding device, and implements the foregoing network slice in a physical network. The instruction includes information such as a target physical device, a network slice identifier, a device slice allocation instruction set, a link allocation instruction, and a basic association configuration. A specific implementation process is that: The centralized control unit sends the installation instruction to a target device by using a control channel, and a distributed unit of the target device parses the network slice identifier, and executes the installation instruction for the network slice. In this case, the network slice creation process is completed.

After the network slice is created, the forwarding device may receive an initial forwarding policy sent by the control device, and perform escape processing on the forwarding policy and transfer the forwarding policy to a distributed control plane of the service network slice.

Specifically, in this embodiment of the present application, the control device encapsulates control information into a slice control message (that is, an example of a control packet) based on a slice ID (that is, an example of a network slice identifier), and delivers the control information to a forwarding device on which a network slice indicated by the slice ID is borne.

After decapsulating the slice control message, the forwarding device determines, based on the slice ID, control information corresponding to each network slice, and installs the control information on a data plane of a corresponding network slice.

All control instructions of a subsequent service network slice are directly delivered to the forwarding device by using a control channel of the subsequent service network slice.

Specifically, the control device and the forwarding device may transmit control information by using a control channel of the slice 0, and the control channel may use protocols such as Netconf, BGP-LS, and OpenFlow.

In this embodiment of the present application, the forwarding device may run a fault monitoring program to monitor a slice resource of the forwarding device.

In addition, after a fault occurs, the forwarding device may search for a local resource of an affected network slice, and run a fault recovery program.

For example, for a network slice configured with a backup resource, the forwarding device may perform resource switching, and report an active/standby handover event to the control device.

For another example, for a network slice without a backup resource, the forwarding device may report a fault event, and wait for the control device to perform remapping.

After the process crashes because a fault cannot be eliminated, the control device instructs, by using the slice 0, each forwarding device to restart a service network slice software process, re-initialize the device slice, and re-allocate the device slice until the fault recovery succeeds, and report a service device slice restart event. If the fault recovery fails, a fault event is reported.

According to the method for controlling a network slice in this embodiment of the present application, the control device sends, to the first forwarding device, the first control packet that carries the N pieces of control information and the N network slice identifiers, so that the first forwarding device can determine, based on the one-to-one correspondence between the N pieces of control information and the N network slice identifiers, a network slice controlled by using each piece of control information, and can determine, from the N pieces of control information, the first control information corresponding to the first network slice (specifically, an identifier of the first network slice) that is borne on the first forwarding device, and further the first forwarding device can control or manage the first network slice based on the first control information. Therefore, in this embodiment of the present application, without distinguishing network slices corresponding to different control information, the control device can complete delivering of each piece of control information, to reduce processing burden of the control device.

Figure 3:
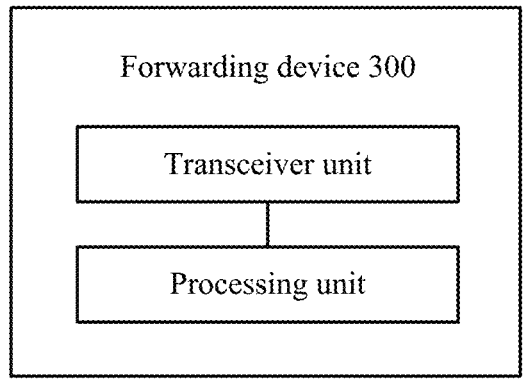
FIG. 3 is a schematic block diagram of an example of a forwarding device according to an embodiment of the present application.

FIG. 3 is a schematic block diagram of an example of a forwarding device 300 according to an embodiment of the present application. The apparatus 300 for controlling a network slice may correspond to the first forwarding device (for example, the forwarding device #A) described in the system 100 and the method 200 (for example, the apparatus 300 is configured as the first forwarding device or the apparatus 300 itself is the first forwarding device), and each module or unit in the forwarding device 300 is configured to perform functions of the first forwarding device (for example, the forwarding device #A) in the system 100 and the method 200, and actions or processing processes that are performed by the first forwarding device in the system 100 and the method 200. To avoid repetition, detailed descriptions thereof are omitted herein.

Figure 4:
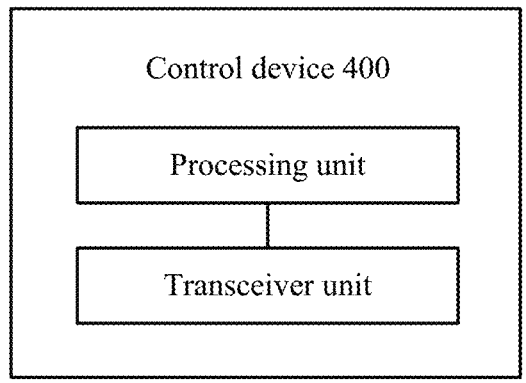
FIG. 4 is a schematic block diagram of an example of a control device according to an embodiment of the present application.

FIG. 4 is a schematic block diagram of an example of a control device 400 according to an embodiment of the present application. The control device 400 may correspond to the control device described in the system 100 and the method 200 (for example, the control device 400 is configured as the control device described in the system 100 and the method 200 or the control device 400 itself is the control device described in the system 100 and the method 200), and each module or unit in the control device 400 is configured to perform functions of the control device in the system 100 and the method 200, and actions or processing processes that are performed by the control device in the system 100 and the method 200. To avoid repetition, detailed descriptions thereof are omitted herein.

Figure 5:
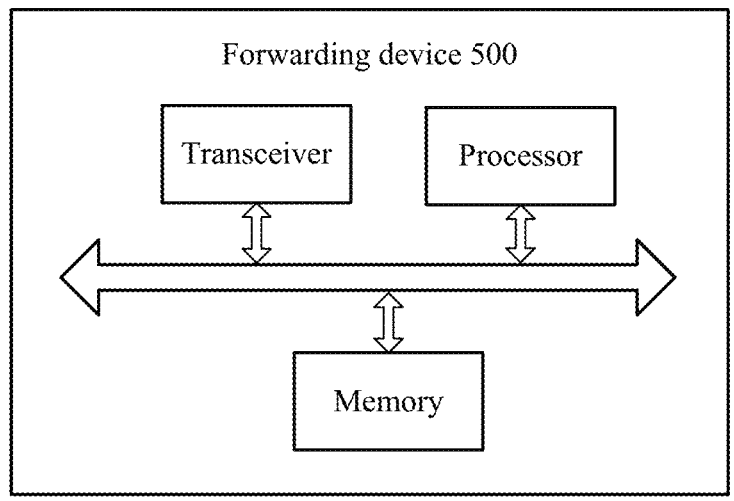
FIG. 5 is a schematic block diagram of another example of a forwarding device according to an embodiment of the present application.

FIG. 5 is a schematic block diagram of an example of a forwarding device 500 according to an embodiment of the present application. The forwarding device 500 includes a processor and a transceiver, and the processor is communicatively connected to the transceiver. Optionally, the forwarding device 500 further includes a memory, and the memory is communicatively connected to the processor. The memory may be configured to store an instruction, and the processor is configured to execute the instruction stored in the memory, to control the transceiver to receive information or a signal, so that the forwarding device 500 performs functions of the first forwarding device (for example, the forwarding device #A) in the system 100 and the method 200, and actions or processing processes that are performed by the first forwarding device in the system 100 and the method 200.

The forwarding device 500 may correspond to the first forwarding device (for example, the forwarding device #A) described in the system 100 and the method 200 (for example, the forwarding device 500 is configured as the first forwarding device or the forwarding device 500 itself is the first forwarding device), and each module or unit in the forwarding device 500 is configured to perform functions of the first forwarding device (for example, the forwarding device #A) in the system 100 and the method 200, and actions or processing processes that are performed by the first forwarding device in the system 100 and the method 200. To avoid repetition, detailed descriptions thereof are omitted herein.

Figure 6:
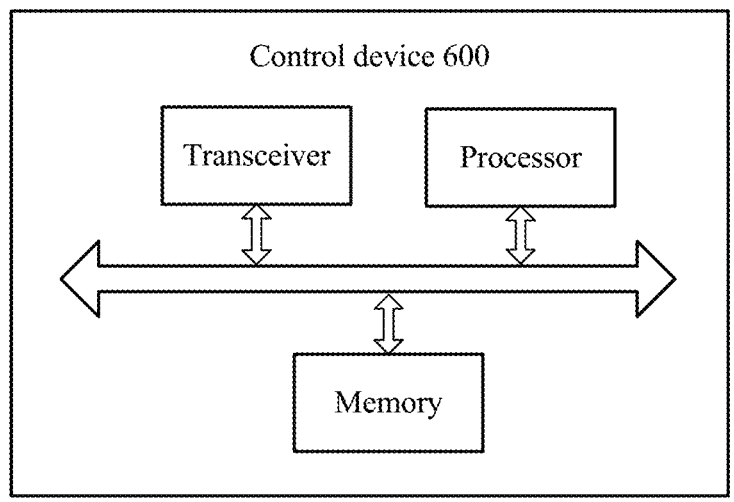
FIG. 6 is a schematic block diagram of another example of a control device according to an embodiment of the present application.

FIG. 6 is a schematic block diagram of an example of a control device 600 according to an embodiment of the present application. The control device 600 includes a processor and a transceiver, and the processor is communicatively connected to the transceiver. Optionally, the control device 600 further includes a memory, and the memory is communicatively connected to the processor. The memory may be configured to store an instruction, and the processor is configured to execute the instruction stored in the memory, to control the transceiver to receive information or a signal, so that the control device 600 performs functions of the control device in the system 100 and the method 200, and actions or processing processes that are performed by the control device in the system 100 and the method 200.

The control device 600 may correspond to the control device described in the system 100 and the method 200 (for example, the control device 600 is configured as the control device described in the system 100 and the method 200 or the control device 600 itself is the control device described in the system 100 and the method 200), and each module or unit in the control device 600 is configured to perform functions of the control device in the system 100 and the method 200, and actions or processing processes that are performed by the control device in the system 100 and the method 200. To avoid repetition, detailed descriptions thereof are omitted herein.

It should be noted that, this embodiment of the present application may be applied to the processor, or implemented by the processor. The processor may be an integrated circuit chip with a signal processing capability. In an implementation process, operations in the foregoing method embodiment may be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA), another programmable logic device, a discrete gate, a transistor logic device, or a discrete hardware component. All methods, operations, and logical block diagrams disclosed in this embodiment of the present application may be implemented or performed. The general purpose processor may be a microprocessor or the processor may be any conventional processor, or the like. Operations of the methods disclosed in the embodiments of the present application may be directly performed and completed by a hardware decoding processor, or may be performed and completed by using a combination of hardware and software modules in the decoding processor. The software module may be located in a storage medium in the field, such as a random access memory, a flash memory, a read-only memory, a programmable read-only memory, an electrically-erasable programmable memory, or a register. The storage medium is located in the memory, and the processor reads information in the memory and completes the operations in the foregoing methods in combination with hardware of the processor.

It may be understood that, the memory in the embodiments of the present application may be a volatile memory or a nonvolatile memory, or may include a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. For example but not for limitation, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and method described in this specification aims to include but is not limited to these memories and any memory of another proper type.

Figure 7:
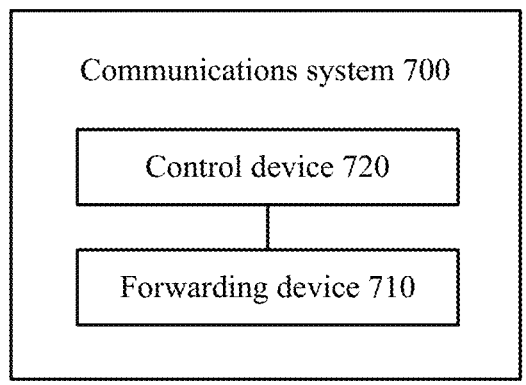
FIG. 7 is a schematic block diagram of an example of a communications system according to an embodiment of the present application.

FIG. 7 is a schematic block diagram of an example of a communications system 700 according to an embodiment of the present application. As shown in FIG. 7, the communications system 700 includes a forwarding device 710 and a control device 720. The forwarding device 710 may correspond to the first forwarding device (for example, the forwarding device #A) described in the system 100 and the method 200 (for example, the forwarding device 710 is configured as the first forwarding device or the forwarding device 710 itself is the first forwarding device), and each module or unit in the forwarding device 710 is configured to perform functions of the first forwarding device (for example, the forwarding device #A) in the system 100 and the method 200, and actions or processing processes that are performed by the first forwarding device in the system 100 and the method 200. To avoid repetition, detailed descriptions thereof are omitted herein. In addition, the control device 720 may correspond to the control device described in the system 100 and the method 200 (for example, the control device 720 is configured as the control device described in the system 100 and the method 200 or the control device 720 itself is the control device described in the system 100 and the method 200), and each module or unit in the control device 720 is configured to perform the functions of the control device in the system 100 and the method 200, and actions or processing processes that are performed by the control device in the system 100 and the method 200. To avoid repetition, detailed descriptions thereof are omitted herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present application. The execution sequences of the processes should be determined according to functions and internal logic of the processes, and should not be construed as any limitation on the implementation processes of the embodiments of the present application.

A person of ordinary skill in the art may be aware that, the units and algorithm operations in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the system, apparatus, and unit, may refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in the embodiments of the present application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the operations of the methods described in the embodiments of the present application. The foregoing storage medium includes: any medium that can store program code, such as a USB flash drive, a removable hard disk, a ROM, a RAM, a magnetic disk, or an optical disc.

The foregoing descriptions are merely specific implementations of the present application, but are not intended to limit the protection scope of the embodiments of the present application. Any variation or replacement readily figured out by a person skilled in the art within the technical scope disclosed in the present application shall fall within the protection scope of the embodiments of the present application.

What is claimed is:

1. A method for controlling a network slice by a system that comprises a control device and at least one forwarding device, the method comprising:

receiving, by a first forwarding device, a first control packet sent by the control device, wherein the first control packet carries N pieces of control information and N network slice identifiers, the N pieces of control information are in a one-to-one correspondence with the N network slice identifiers, and a network slice identifier i corresponding to control information i is an identifier of a network slice controlled by using the control information i, wherein $i \in [1, N]$, and $N \geq 1$;

determining, by the first forwarding device, M pieces of first control information from the N pieces of control information based on the N network slice identifiers, wherein the M pieces of first control information are in a one-to-one correspondence with M first network slices, and the M first network slices are borne on the first forwarding device, wherein $M \geq 1$; and controlling, by the first forwarding device, a first network slice j from the M first network slices based on first control information j from the M pieces of first control information, wherein $j \in [1, M]$.

2. The method according to claim 1, wherein each of the N pieces of control information is one of the M pieces of first control information.

3. The method according to claim 1, wherein the N pieces of control information comprise second control information in addition to the M pieces of first control information, the second control information is used to control a second network slice, and the second network slice is borne on a second forwarding device.

4. The method according to claim 1, wherein the communications system comprises a common network slice, and the common network slice is borne on all forwarding devices in the system.

5. The method according to claim 4, wherein the receiving, by a first forwarding device, a first control packet sent by the control device comprises:

receiving, by the first forwarding device by using a control channel of the common network slice, the first control packet sent by the control device.

6. A method for controlling a network slice by a system that comprises a control device and at least one forwarding device, the method comprising:

obtaining, by the control device, N pieces of control information and N network slice identifiers, wherein the N pieces of control information are in a one-to-one correspondence with the N network slice identifiers, and a network slice identifier i corresponding to control information i is an identifier of a network slice controlled by using the control information i, the N pieces of control information comprise M pieces of first control information, the M pieces of first control information are in a one-to-one correspondence with M first network slices, and the M first network slices are borne on a first forwarding device, wherein $i \in [1, N]$, $N \geq 1$, and $M \geq 1$; and sending, by the control device, a first control packet to the first forwarding device, wherein the first control packet carries the N pieces of control information and the N network slice identifiers.

7. The method according to claim 6, wherein each of the N pieces of control information is one of the M pieces of first control information.

8. The method according to claim 6, wherein the N pieces of control information comprise second control information in addition to the M pieces of first control information, the second control information is used to control a second network slice, and the second network slice is borne on a second forwarding device.

9. The method according to 6, wherein the communications system comprises a common network slice, and the common network slice is borne on all forwarding devices in the system.

10. The method according to claim 9, wherein the sending, by the control device, a first control packet to the first forwarding device comprises:
   sending, by the control device, the first control packet to the first forwarding device by using a control channel of the common network slice.

11. A forwarding device, used as a first forwarding device, the first forwarding device comprising:
   a transceiver configured to receive a first control packet sent by a control device, wherein the first control packet carries N pieces of control information and N network slice identifiers, the N pieces of control information are in a one-to-one correspondence with the N network slice identifiers, and a network slice identifier i corresponding to control information i is an identifier of a network slice controlled by using the control information i, wherein, i∈[1, N], and N≥1; and
   a processor configured to:
      determine M pieces of first control information from the N pieces of control information based on the N network slice identifiers, wherein the M pieces of first control information are in a one-to-one correspondence with M first network slices, and the M first network slices are borne on the first forwarding device, wherein M≥1; and
      control a first network slice j from the M first network slices based on first control information j from the M pieces of first control information, wherein j∈[1, M].

12. The forwarding device according to claim 11, wherein each of the N pieces of control information is one of the M pieces of first control information.

13. The forwarding device according to claim 11, wherein the N pieces of control information comprise second control information in addition to the M pieces of first control information, the second control information is used to control a second network slice, and the second network slice is borne on a second forwarding device.

14. The forwarding device according to claim 11, wherein a communications system comprises a common network slice, and the common network slice is borne on all forwarding devices in the system.

15. The forwarding device according to claim 14, wherein the transceiver is configured to receive, by using a control channel of the common network slice, the first control packet sent by the control device.

16. A control device, comprising:
   A processor configured to obtain N pieces of control information and N network slice identifiers, wherein the N pieces of control information are in a one-to-one correspondence with the N network slice identifiers, and a network slice identifier i corresponding to control information i is an identifier of a network slice controlled by using the control information i, the N pieces of control information comprise M pieces of first control information, the M pieces of first control information are in a one-to-one correspondence with M first network slices, and the M first network slices are borne on a first forwarding device, wherein i∈[1, N], N≥1, and M≥1; and
   a transceiver, configured to send a first control packet to the first forwarding device, wherein the first control packet carries the N pieces of control information and the N network slice identifiers.

17. The control device according to claim 16, wherein each of the N pieces of control information is one of the M pieces of first control information.

18. The control device according to claim 16, wherein the N pieces of control information comprise second control information in addition to the M pieces of first control information, the second control information is used to control a second network slice, and the second network slice is borne on a second forwarding device.

19. The control device according to claim 16, wherein the communications system comprises a common network slice, and the common network slice is borne on all forwarding devices in the system.

20. The control device according to claim 19, wherein the transceiver is configured to send the first control packet to the first forwarding device by using a control channel of the common network slice.

* * * * *